United States Patent
Chen et al.

(10) Patent No.: US 12,537,691 B2
(45) Date of Patent: Jan. 27, 2026

(54) OFFLOADING AUTHENTICATION TO AN AUTHENTICATOR

(71) Applicant: Ruckus IP Holdings LLC, Claremont, NC (US)

(72) Inventors: Yuzhou Chen, Shenzhen (CN); Zhineng Cui, San Ramon, CA (US); Caiyu Wang, Shenzhen (CN); Wenjun Ji, Shenzhen (CN); Tyan-Shu Jou, Fremont, CA (US)

(73) Assignee: Ruckus IP Holdings LLC, Claremont, NC (US)

( * ) Notice: Subject to any disclaimer, the term of this patent is extended or adjusted under 35 U.S.C. 154(b) by 304 days.

(21) Appl. No.: 17/986,041

(22) Filed: Nov. 14, 2022

(65) Prior Publication Data

US 2023/0155838 A1 May 18, 2023

Related U.S. Application Data

(60) Provisional application No. 63/280,182, filed on Nov. 17, 2021.

(51) Int. Cl.
*H04L 9/32* (2006.01)
*H04L 9/40* (2022.01)

(52) U.S. Cl.
CPC ........ *H04L 9/3242* (2013.01); *H04L 63/0892* (2013.01)

(58) Field of Classification Search
None
See application file for complete search history.

(56) References Cited

U.S. PATENT DOCUMENTS

| 10,389,708 | B1* | 8/2019 | Goodsitt | H04L 9/0643 |
| 2004/0168054 | A1* | 8/2004 | Halasz | H04W 12/062 |
| | | | | 713/155 |

(Continued)

FOREIGN PATENT DOCUMENTS

WO 2017171835 A1 10/2017

OTHER PUBLICATIONS

"European Search Report in Corresponding Patent Application No. 22207913.9, mailed Apr. 19, 2023, 9 pages".

(Continued)

*Primary Examiner* — Syed A Roni
(74) *Attorney, Agent, or Firm* — Myers Bigel, P.A.

(57) ABSTRACT

An electronic device (such as an access point) that selectively performs authentication to a network is described. During operation, the electronic device provides an identity request addressed to the second electronic device. Then, the electronic device receives, associated with the second electronic device, an identity response. In response, when the authentication computer is unavailable, the electronic device accesses, in memory, a predefined hash function and associated authentication parameters for an authentication technique. Next, the electronic device performs authentication with the second electronic device based at least in part on the predefined hash function, where the authentication is compatible with the authentication technique (a type of Extensible Authentication Protocol or EAP). Moreover, the electronic device generates an encryption key, and establishes secure communication with the second electronic device by performing a four-way handshake with the second electronic device based at least in part on the encryption key.

20 Claims, 5 Drawing Sheets

(56) References Cited

U.S. PATENT DOCUMENTS

| | | |
|---|---|---|
| 2020/0137056 A1 | 4/2020 | Havaralu Rama Chandra Adiga et al. |
| 2020/0358860 A1 | 11/2020 | Venkataraman et al. |
| 2021/0194860 A1* | 6/2021 | Lee ...................... H04L 9/3242 |

OTHER PUBLICATIONS

"Public key certificate—wikipedia", Retrieved from the Internet: URL:https://en.wikipedia.org/w/index.php?title=Public_key_certificate&oldid=10548334 68, 2021.

* cited by examiner

OFFLOADING AUTHENTICATION TO AN AUTHENTICATOR

CROSS REFERENCE TO RELATED APPLICATIONS

This application claims priority under 35 U.S.C. 119(e) to U.S. Provisional Application Ser. No. 63/280,182, "Offloading Authentication to an Authenticator," filed on Nov. 17, 2021, by Yuzhou Chen, et al., the contents of which are herein incorporated by reference.

FIELD

The described embodiments relate to techniques for offloading authenticating from an authentication computer to an authenticator.

BACKGROUND

Many electronic devices are capable of wirelessly communicating with other electronic devices. In particular, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Washington), and/or another type of wireless network. For example, many electronic devices communicate with each other via wireless local area networks (WLANs) using an IEEE 802.11-compatible communication protocol (which is sometimes collectively referred to as 'Wi-Fi'). In a typical deployment, a Wi-Fi-based WLAN includes one or more access points (or basic service sets or BSSs) that communicate wirelessly with each other and with other electronic devices using Wi-Fi, and that provide access to another network (such as the Internet) via IEEE 802.3 (which is sometimes referred to as 'Ethernet').

One challenge is managing a network is how to authenticate users to confirm their identity and to authorize their access to the network. In enterprise wireless networks (such as an enterprise wireless local area network or WLAN), IEEE 802.1x authentication is widely used when a user accesses a WEAN. Moreover, in a large-scale WLAN deployment, IEEE 802.1x authentication message are typically forwarded to a remote authentication dial-in user service (RADIUS) server for processing.

However, the architecture can result in a variety of problems. For example, the RADIUS server may become overload, which result in IEEE 802.1x failure or delayed authentication. Alternatively or additionally, when the RADIUS server is unavailable for an extended period of time, then clients may be unable to join the FLAN until the RADIUS server is back in service or available. These delays or barriers to network access are frustrating to users and network administrators.

SUMMARY

An electronic device that selectively performs authentication to a network is described. This electronic device may include: one or more interface circuits that communicate with a second electronic device and an authentication computer; a processor; and a memory that stores program instructions, where, when executed by the processor, the program instructions cause the electronic device to perform operations. Notably, during operation, the electronic device provides an identity request addressed to the second electronic device. Then, the electronic device receives, associated with the second electronic device, an identity response. In response, when the authentication computer is unavailable, the electronic device accesses, in the memory, a predefined hash function and associated authentication parameters for an authentication technique. Next, the electronic device performs authentication with the second electronic device based at least in part on the predefined hash function, where the authentication is compatible with the authentication technique. Moreover, the electronic device generates an encryption key, and establishes secure communication with the second electronic device by performing a four-way handshake with the second electronic device based at least in part on the encryption key.

Note that the electronic device may include an access point.

Moreover, the authentication computer may include a RADIUS server or an authentication, authorization, and accounting (AAA) server.

Furthermore, the second electronic device may have previously been authenticated by the authentication computer and then may have disconnected from the electronic device. After the authentication computer authenticated the second electronic device, the electronic device may have: received, associated with the authentication computer, the predefined hash function and the authentication parameters, where the predefined hash function and the authentication parameters are associated with the second electronic device; and stored, in the memory, the predefined hash function and the authentication parameters.

Additionally, the authentication parameters may specify a time interval for the predefined hash function. After the time interval has elapsed, the electronic device may delete the predefined hash function.

Note that the authentication technique may include a type of Extensible Authentication Protocol (EAP).

In some embodiments, prior to providing the identity request, the electronic device may associate with (or establish a connection with) the second electronic device.

Moreover, the encryption key may include a pairwise master key (PMK).

Furthermore, the electronic device may provide, addressed to the authentication computer, a renewal request prior to the time interval elapsing. In response, the electronic device may receive, associated with the authentication computer, a second predefined hash function and second authentication parameters. Then, the electronic device may store, in the memory, the second predefined hash function and the second authentication parameters.

Additionally, the four-way handshake may include or may be compatible with EAP over local area network (EAPol).

Moreover, the network may include a virtual network associated with a location. For example, the virtual network may include: a virtual local area network (VLAN) or a virtual extensible local area network (VXLAN).

Another embodiment provides the second electronic device that performs counterpart operations to at least some of the aforementioned operations of the electronic device.

Another embodiment provides the authentication computer that performs counterpart operations to at least some of the aforementioned operations of the electronic device.

Another embodiment provides a system that includes the electronic device and/or the authentication computer.

Another embodiment provides a computer-readable storage medium with program instructions for use with one of the aforementioned components. When executed by the component, the program instructions cause the component to perform at least some of the aforementioned operations in one or more of the preceding embodiments.

Another embodiment provides a method, which may be performed by one of the aforementioned components. This method includes at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
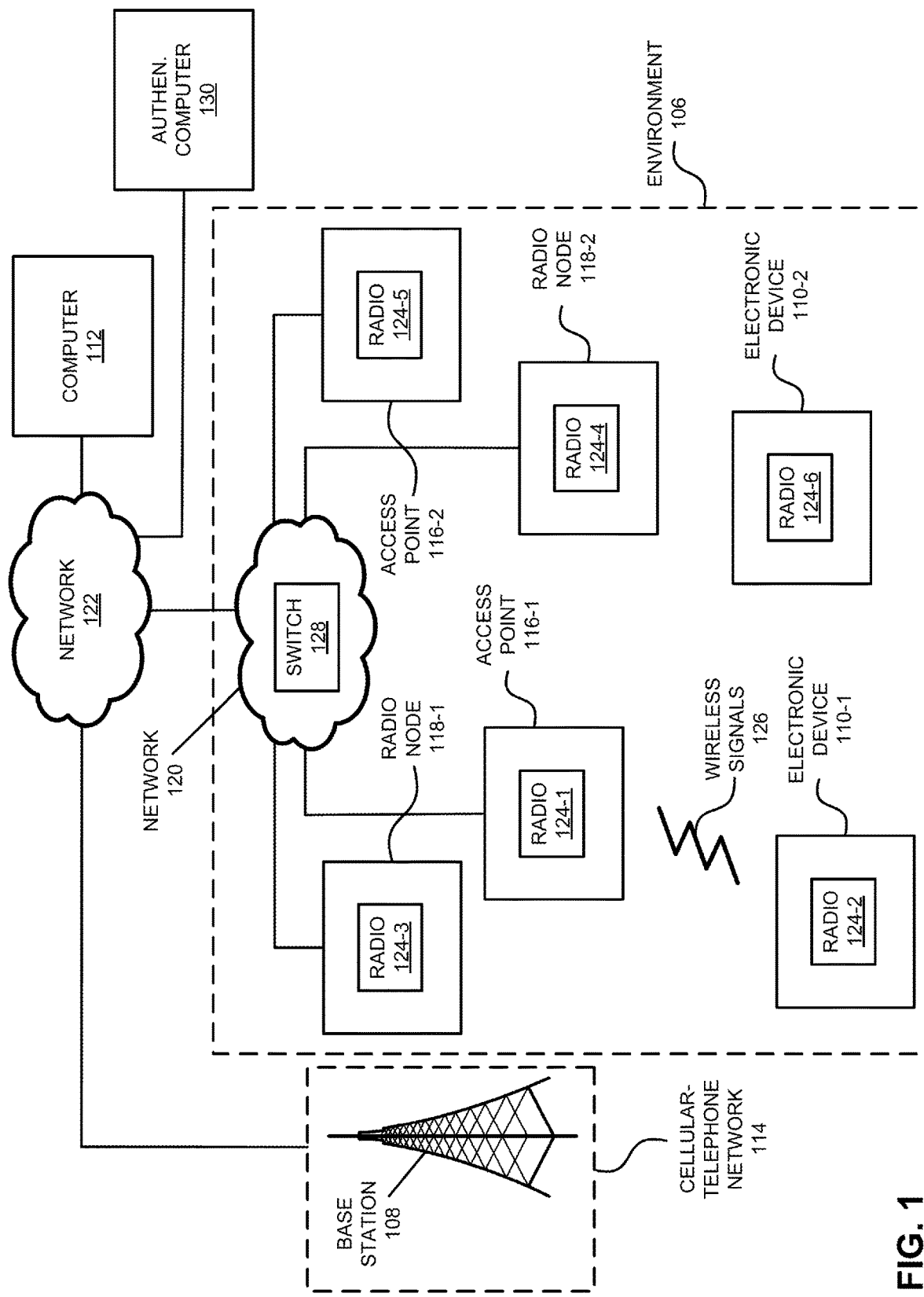
FIG. 1 is a block diagram illustrating an example of communication among electronic devices in accordance with an embodiment of the present disclosure.

An electronic device (such as an access point) that selectively performs authentication to a network is described. During operation, the electronic device provides an identity request addressed to the second electronic device. Then, the electronic device receives, associated with the second electronic device, an identity response. In response, when the authentication computer is unavailable, the electronic device accesses, in memory, a predefined hash function and authentication parameters for an authentication technique. Next, the electronic device performs authentication with the second electronic device based at least in part on the predefined hash function, where the authentication is compatible with the authentication technique (a type of EAP). Moreover, the electronic device generates an encryption key, and establishes secure communication with the second electronic device by performing a four-way handshake with the second electronic device based at least in part on the encryption key.

By selectively performing the authentication technique, these communication techniques may facilitate authentication and secure access to the network. Notably, the communication techniques may provide reliable authentication and secure access to the network, even when the authentication computer is unavailable. In the process, the communication techniques may eliminate delays in authenticating users. Consequently, the communication techniques may reduce frustration of the users and network operators or network administrators, and may improve the user experience when using in the network.

In the discussion that follows, electronic devices or components in a system communicate packets in accordance with a wireless communication protocol, such as: a wireless communication protocol that is compatible with an IEEE 802.11 standard (which is sometimes referred to as Wi-Fi®, from the Wi-Fi Alliance of Austin, Texas), Bluetooth, a cellular-telephone network or data network communication protocol (such as a third generation or 3G communication protocol, a fourth generation or 4G communication protocol, e.g., Long Term Evolution or LTE (from the 3rd Generation Partnership Project of Sophia Antipolis, Valbonne, France), LTE Advanced or LTE-A, a fifth generation or 5G communication protocol, or other present or future developed advanced cellular communication protocol), and/or another type of wireless interface (such as another wireless-local-area-network interface). For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. Moreover, an access point, a radio node, a base station or a switch in the wireless network may communicate with a local or remotely located computer (such as a controller) using a wired communication protocol, such as a wired communication protocol that is compatible with an IEEE 802.3 standard (which is sometimes referred to as 'Ethernet'), e.g., an Ethernet II standard. However, a wide variety of communication protocols may be used in the system, including wired and/or wireless communication. In the discussion that follows, Wi-Fi, LTE and Ethernet are used as illustrative examples.

We now describe some embodiments of the communication techniques. FIG. 1 presents a block diagram illustrating an example of communication in an environment 106 with one or more electronic devices 110 (such as cellular telephones, portable electronic devices, stations or clients, another type of electronic device, etc., which are sometimes referred to as 'end devices') via a cellular-telephone network 114 (which may include a base station 108), one or more access points 116 (which may communicate using Wi-Fi) in a WLAN and/or one or more radio nodes 118 (which may communicate using LTE) in a small-scale network (such as a small cell). For example, the one or more radio nodes 118 may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than LTE), etc. In the discussion that follows, an access point, a radio node or a base station are sometimes referred to generically as a 'communication device.' Moreover, as noted previously, one or more base stations (such as base station 108), access points 116, and/or radio nodes 118 may be included in one or more wireless networks, such as: a WLAN, a small cell, and/or a cellular-telephone network. In some embodiments, access points 116 may include a physical access point and/or a virtual access point that is implemented in software in an environment of an electronic device or a computer.

Note that access points 116 and/or radio nodes 118 may communicate with each other, computer 112 (which may be a cloud-based controller that manages and/or configures access points 116, radio nodes 118 and/or switch 128, or that provides cloud-based storage and/or analytical services) and/or authentication computer 130 (such as a RADIUS server and/or an AAA server) using a wired communication protocol (such as Ethernet) via network 120 and/or 122. Note that networks 120 and 122 may be the same or different networks. For example, networks 120 and/or 122 may an LAN, an intra-net or the Internet. In some embodiments, network 120 may include one or more routers and/or switches (such as switch 128).

Figure 6:
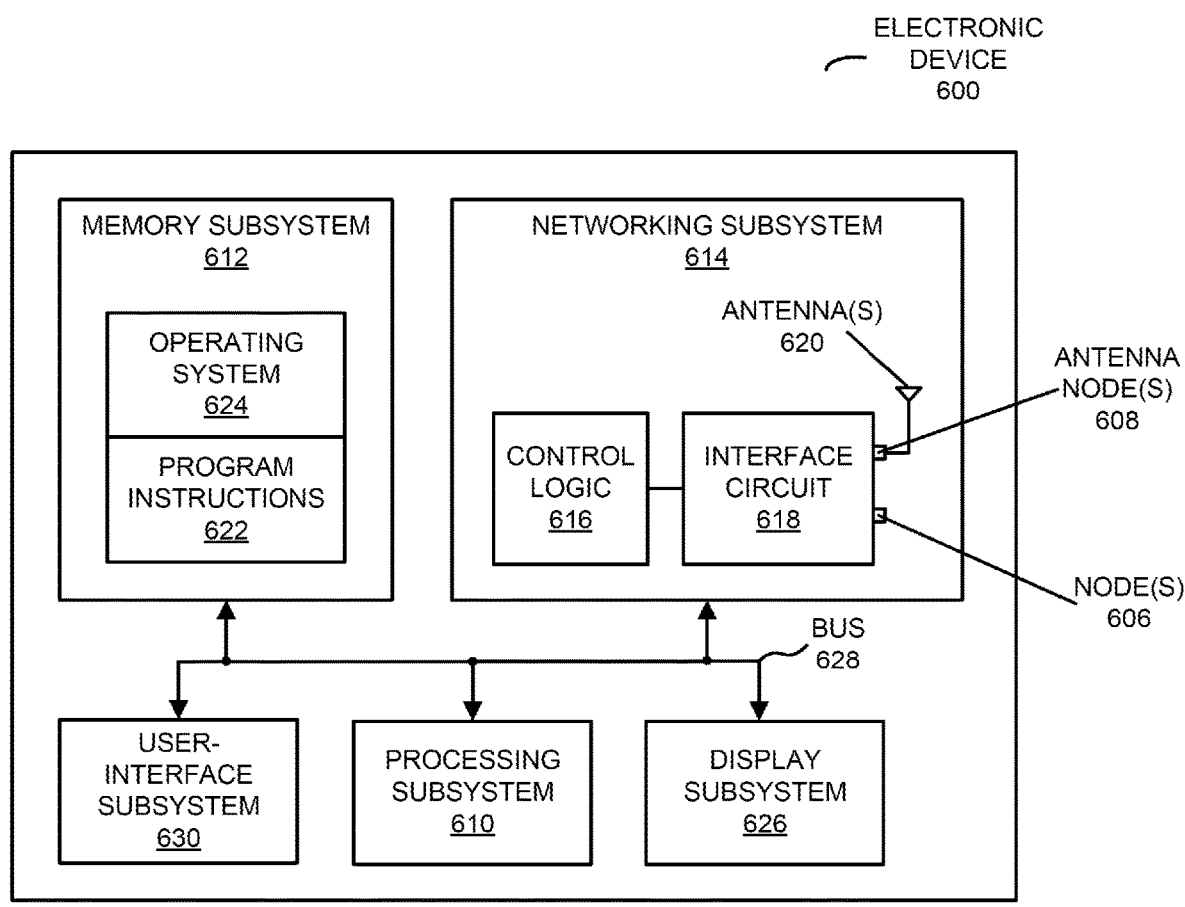
FIG. 6 is a block diagram illustrating an example of an electronic device in accordance with an embodiment of the present disclosure.

As described further below with reference to FIG. 6, electronic devices 110, computer 112, access points 116, radio nodes 118, switch 128 and authentication computer 130 may include subsystems, such as a networking subsystem, a memory subsystem and a processor subsystem. In addition, electronic devices 110, access points 116 and radio nodes 118 may include radios 124 in the networking subsystems. More generally, electronic devices 110, access points 116 and radio nodes 118 can include (or can be included within) any electronic devices with the networking subsystems that enable electronic devices 110, access points 116 and radio nodes 118 to wirelessly communicate with one or more other electronic devices. This wireless communication can comprise transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

During the communication in FIG. 1, access points 116 and/or radio nodes 118 and electronic devices 110 may wired or wirelessly communicate while: transmitting access requests and receiving access responses on wireless channels, detecting one another by scanning wireless channels, establishing connections (for example, by transmitting connection requests and receiving connection responses), and/or transmitting and receiving frames or packets (which may include information as payloads).

As can be seen in FIG. 1, wireless signals 126 (represented by a jagged line) may be transmitted by radios 124 in, e.g., access points 116 and/or radio nodes 118 and electronic devices 110. For example, radio 124-1 in access point 116-1 may transmit information (such as one or more packets or frames) using wireless signals 126. These wireless signals are received by radios 124 in one or more other electronic devices (such as radio 124-2 in electronic device 110-1). This may allow access point 116-1 to communicate information to other access points 116 and/or electronic device 110-1. Note that wireless signals 126 may convey one or more packets or frames.

In the described embodiments, processing a packet or a frame in access points 116 and/or radio nodes 118 and electronic devices 110 may include: receiving the wireless signals with the packet or the frame; decoding/extracting the packet or the frame from the received wireless signals to acquire the packet or the frame; and processing the packet or the frame to determine information contained in the payload of the packet or the frame.

Note that the wireless communication in FIG. 1 may be characterized by a variety of performance metrics, such as: a data rate for successful communication (which is sometimes referred to as 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 124 are shown in components in FIG. 1, one or more of these instances may be different from the other instances of radios 124.

In some embodiments, wireless communication between components in FIG. 1 uses one or more bands of frequencies, such as: 900 MHz, 2.4 GHz, 5 GHz, 6 GHz, 60 GHz, the Citizens Broadband Radio Spectrum or CBRS (e.g., a frequency band near 3.5 GHz), and/or a band of frequencies used by LTE or another cellular-telephone communication protocol or a data communication protocol. Note that the communication between electronic devices may use multi-user transmission (such as orthogonal frequency division multiple access or OFDMA).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As discussed previously, when authentication computer 130 is unavailable, it can be difficult for electronic devices 110 to authenticate and obtain secure access to networks 120 and/or 122. Moreover, as described further below with reference to FIGS. 2-5, in order to address these problems, an electronic device (such as access point 116-1, radio node 118-1 or switch 128, and more generally a computer network device) may perform the disclosed communication techniques. In the discussion that follows, access point 116-1 is used to illustrate the communication techniques.

During operation, an electronic device 110-1 may discover and associate with (or establish a connection with) access point 116-1 (and, thus, with a network, such as a WLAN and/or network 120, provided by access point 116-1). For example, electronic device 110-1 may provide an authentication request to access point 116-1. Then, access point 116-1 may provide a user-equipment context request to computer 112. Computer 112 may subsequently provide a user-equipment context response to access point 116-1, which may confirm that there is not an existing context or association for electronic device 110-1 in the WLAN.

Moreover, access point 116-1 may provide an authentication response to electronic device 110-1. Next, electronic device 110-1 may provide an association request to access point 116-1, which may respond by providing an association response to electronic device 110-1. Note that, at this point there is a connection between electronic device 110-1 and access point 116-1, but the communication is not encrypted. Furthermore, computer 112 may provide the user-equipment context response to access point 116-1, such as a negative acknowledgment or NACK.

After associating with electronic device 110-1, access point 116-1 may provide an identity request to electronic device 110-1. Then, electronic device 110-1 may provide an identity response to access point 116-1.

In order to address circumstances in which authentication computer 130 is unavailable, access point 116-1 may be configured to perform authentication of electronic device 110-1 to network 120 and/or network 122. Notably, electronic device 110-1 may have previously been authenticated by authentication computer 130 and then electronic device 110-1 may have disconnected from access point 116-1. After authentication computer 130 authenticated electronic device 110-1, access point 116-1 may have: received, from authentication computer 130, a predefined hash function and associated authentication parameters, where the predefined hash function and the authentication parameters are associated with electronic device 110-1; and stored, in memory in or associated with access point 116-1, the predefined hash function and the authentication parameters.

Therefore, after receiving the identity response and when authentication computer 130 is unavailable, access point 116-1 may access, in the memory in or associated with access point 116-1, the predefined hash function and the authentication parameters for an authentication technique (such as a type of EAP). Next, access point 116-1 may perform authentication with electronic device 110-1 based at least in part on the predefined hash function, where the authentication is compatible with the authentication technique. Moreover, access point 116-1 may generate an encryption key (such as a PMIS), and may establish secure communication with electronic device 110-1 by performing a four-way handshake with electronic device 110-1 based at least in part on the encryption key. For example, the four-way handshake may include or may be compatible with EAPol. As discussed further below, note that in some authentication techniques the authentication is performed by access point 116-1 during the four-way handshake with electronic device 110-1.

In some embodiments, the authentication parameters may specify a time interval for the predefined hash function. Consequently, after the time interval has elapsed, access point 116-1 may delete the predefined hash function, e.g., in the memory. Alternatively, when authentication computer 130 is available, access point 116-1 may provide, to authentication computer 130, a renewal request prior to the time interval elapsing. In response, access point 116-1 may receive, from authentication computer 130, a second predefined hash function and second authentication parameters. Then, access point 116-1 may store, in the memory, the second predefined hash function and the second authentication parameters.

In these ways, the communication techniques may offload authentication to an authenticator, such as access point 116-1. Notably, the communication techniques may allow access point 116-1 to selectively authenticate and provide secure access by electronic device 110-1 to a network. This capability may allow dynamic secure access to the network (such as access at one or more locations and/or at different times), even when authentication computer 130 is unavailable. Consequently, the communication techniques may improve the user experience when using electronic device 110-1, access point 116-1 and communicating via the network.

We now discuss embodiments in which the authentication is performed by access point 116-1 during the four-way handshake with electronic device 110-1. Notably, after receiving the identification response and generating the encryption key, access point 116-1 may provide, to electronic device 110-1, a first message in a four-way handshake with electronic device 110-1. This first message may include a random number associated with access point 116-1 (which is sometimes referred to as an 'ANonce'). In response, electronic device 110-1 may construct, derive or generate a pairwise transient key (PTK). For example, the PTK may be constructed or generated using a cryptographic calculation (such as a pseudo-random function) and optionally a pre-shared key (such as a passphrase, e.g., a dynamic pre-shared key or DPSK or another type of digital certificate), the ANonce, a second random number associated with electronic device 110-1 (which is sometimes referred to as an 'SNonce'), an identifier of access point 116-1 (such as a media access control or MAC address of access point 116-1), and/or an identifier of electronic device 110-1 (such as a MAC address of electronic device 110-1). Note that the passphrase may be preinstalled or preconfigured on electronic device 110-1 and may be stored in memory that is accessible by access point 116-1. In some embodiments, a user of electronic device 110-1 may receive the passphrase and install it on electronic device 110-1 using a portal (such as website or web page), an email, an SMS message, etc.

Note that the passphrase may be independent of an identifier associated with electronic device 110-1, such as the MAC address of electronic device 110-1. More generally, the passphrase may be independent of electronic device 110-1 or hardware in electronic device 110-1. The passphrase may be associated with a location, such as a room, a building, a communication port (such as a particular Ethernet port), etc. (In general, in the present discussion a 'location' may not be restricted to a physical location, but may be abstracted to include an object or entity associated with a physical location, such as a particular room or building.) Alternatively or additionally, the passphrase may be associated with one or more users, such as a guest or family in a hotel. Thus, in some embodiments, the passphrase includes a common passphrase that is shared by a group of electronic devices (e.g., the common passphrase may be a group DPSK).

Furthermore, electronic device 110-1 may provide a second message in the four-way handshake to access point 116-1. The second message may include the SNonce and a message integrity check (MIC) to access point 116-1. In some embodiments, the second message includes: the inputs to the cryptographic calculation and an output of the cryptographic calculation.

Additionally, instead of providing an access request to authentication computer 130, access point 116-1 may perform authentication and authorization of electronic device 110-1, including comparing cryptographic information specified by passphrase parameters (which may be included in the authentication parameters) with stored information in or associated with access point 116-1 (such as the DPSK or the other type of digital certificate) for electronic device 110-1. More generally, access point 116-1 may use information specified by the passphrase parameters to determine whether electronic device 110-1 is authorized to access network 120 and/or network 122. Note that the passphrase parameters may include: the inputs to the cryptographic calculation and an output of the cryptographic calculation. For example, the passphrase parameters may include: the ANonce, the SNonce, the MIC, the MAC address of electronic device 110-1, and/or the MAC address of access point 116-1. In addition, the passphrase parameters may include other information, such as: a cluster name, a zone name, a service set identifier (SSID) of the WLAN, a basic service set identifier (BSSID) of access point 116-1, and a username of the user.

Notably, access point 116-1 may perform brute-force calculations of outputs of the cryptographic calculation based at least in part on the inputs to the cryptographic calculation and different stored passphrases. When there is a match between one of these calculated outputs and the output received from electronic device 110-1, it may confirm that access point 116-1 is able to construct, derive or generate the same PTK as electronic device 110-1, so that electronic device 110-1 and access point 116-1 will be able to encrypt and decrypt their communication with each other. (Alternatively, instead of performing the brute-force calculations, authentication computer 130 may provide the output of the cryptographic calculation to access point 116-1, so access point 116-1 can directly confirm that there is match with the output received from electronic device 110-1.)

Then, access point 116-1 may optionally access a policy associated with the user (which may be included in the authentication parameters and/or by performing a look up based at least in part on an identifier of the user, such as a username of the user) that governs the access to W LAN (and, more generally, to network 120 and/or network 122). For example, the policy may include the policy may include a time interval when the passphrase is valid. Moreover, the policy may include a location where the passphrase is valid (such as a location of access point 116-1) or the network that the user is allowed to access. In some embodiments, access point 116-1 may communicate with a property management (PM) server (not shown), which is associated with an organization, to determine whether electronic device 110-1 is associated with the location (such as whether a user of electronic device 110-1 is checked into or associated with a room where access point 116-1 is located). Note that the location may include: a room, a building, a communication port, a facility associated with the organization (such as a hotel or an education institution), etc. More generally, access point 116-1 may optionally communicate with the PM server to determine whether one or more criteria associated with the policy are met.

Then, when there is match of the outputs of the cryptographic calculation and/or one or more criteria associated with the policy are met, access point 116-1 may selectively provide access acceptance information in a third message in the four-way handshake to electronic device 110-1. This third message may include information for establishing secure access of electronic device 110-1. For example, the access acceptance information may include: an identifier of electronic device 110-1, a tunnel type, a tunnel medium type, a tunnel privilege group identifier, a filter identifier, and the username.

Furthermore, electronic device 110-1 may provide a fourth message in the four-way handshake to access point 116-1, such as an acknowledgment. At this point, access point 116-1 may establish secure access to the WLAN for electronic device 110-1 (and, more generally, secure access to network 120 and/or network 122, such as an intranet or the Internet). Notably, the secure access may be in a personal area network (PAN) in the WLAN, which is independent of traffic associated with other PANs in the WLAN.

In some embodiments, the secure access may be implemented using a virtual network associated with the location (such as a virtual network for the PAN), and the information in the access acceptance information may allow electronic device 110-1 to establish secure communication with the virtual network. This secure communication may be independent of traffic associated with other users of the WLAN. For example, access point 116-1 may bridge traffic between electronic device 110-1 and another member of a group of electronic devices (such as electronic device 110-2) in the virtual network in the WLAN, where the traffic in the virtual network is independent of other traffic associated with one or more different virtual networks in the network. Note that the virtual network may include a VLAN. Alternatively, when the aforementioned operations of access point 116-1 are performed by switch 128, the virtual network may include a VXLAN. In these embodiments, switch 128 may bridge wired traffic (such as Ethernet frames) associated with electronic device 110-1 in virtual network.

Moreover, the virtual network may be specified by an identifier that is included in the access acceptance information. For example, the identifier may include a VLANID (for use with access point 116-1) or a VNI (for use with switch 128). Moreover, the identifier may include information that is capable of specifying more than 4,096 virtual networks. In some embodiments, the identifier may include 24 bits, which can be used to specify up to 16 million virtual networks.

In some embodiments, the virtual network is implemented in a virtual dataplane in access point 116-1 (such as using a generic routing encapsulation or GRE tunnel). Note that a dataplane is generally responsible for moving data around transmit paths, while a control plane is generally responsible for determining and setting up those transmit paths. The dataplane may be implemented using virtual machines that are executed by multiple cores in one or more processors (which is sometimes referred to as a 'virtual dataplane'), which allows the dataplane to be flexibly scaled and dynamically reconfigured. In the present discussion, a virtual machine is an operating system or application environment that is implemented using software that imitates or emulates dedicated hardware or particular functionality of the dedicated hardware.

Additionally, in some embodiments, the policy allows the user to access multiple networks at different locations (such as different geographic locations, e.g., different hotels in a hotel brand or chain). In these embodiments, the inputs used to calculate the one or more second outputs of the cryptographic calculation may include a given identifier of a given network (such as a given SSID). Moreover, one or more stored passphrases may be organized based at least in part on identifiers of different networks. In these embodiments, related stored passphrases may be grouped based at least in part on a given network that a user is asking to join, which may reduce the computational time need by access point 116-1 to calculate the outputs for the different stored passphrases.

While the preceding discussion illustrated the communication techniques with communication between access point 116-1 (and, more generally, a computer network device) and electronic device 110-1, in other embodiments this communication may be mediated by one or more other components and/or may involve communication with the one or more other components.

Figure 2:
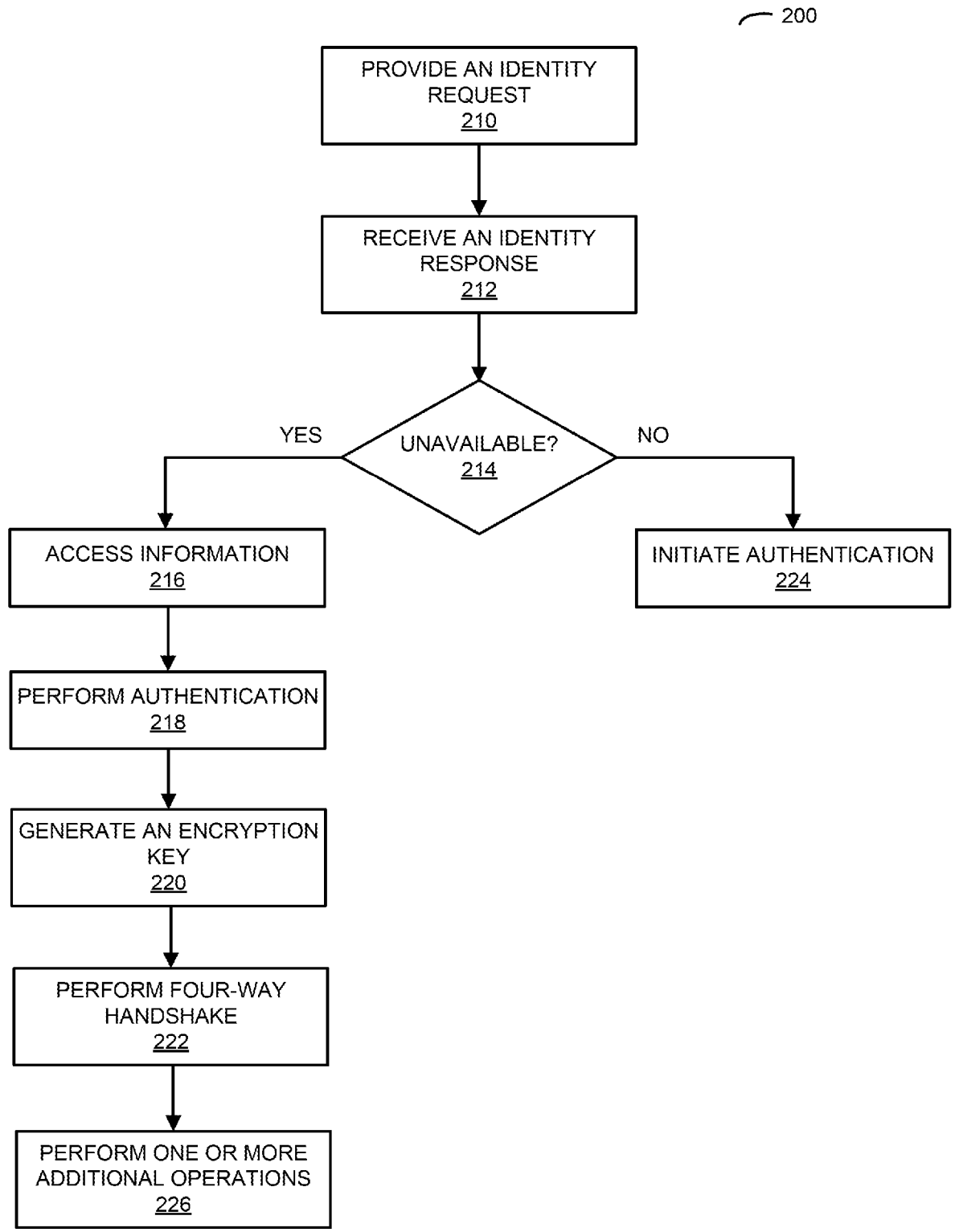
FIG. 2 is a flow diagram illustrating an example of a method for performing authentication to a network using an electronic device in FIG. 1 in accordance with an embodiment of the present disclosure.

We now describe embodiments of the method. FIG. 2 presents a flow diagram illustrating an example of a method 200 for selectively performing authentication to a network, which may be performed by an electronic device, such as one of access points 116, one of radio nodes 118 or switch 128 in FIG. 1. During operation, the electronic device may provide an identity request (operation 210) addressed to a second electronic device. For example, the identity request may include an EAPol identity request.

Then, the electronic device may receive, associated with the second electronic device, an identity response (operation 212). For example, the identity request may include an EAPol identity response with a username of a user.

In response, when an authentication computer is unavailable (operation 214), the electronic device may access, in a memory in or associated with the electronic device, information, including a predefined hash function and associated authentication parameters (operation 216) for an authentication technique (such as a type of EAP).

Next, the electronic device may perform the authentication (operation 218) with the second electronic device based at least in part on the predefined hash function, where the authentication is compatible with the authentication technique. For example, during the authentication (operation 218), the electronic device may provide one or more challenges to the second electronic device and may receive one or more responses from the second electronic device.

Moreover, the electronic device may generate an encryption key (operation 220), and may establish secure communication with the second electronic device by performing a four-way handshake (operation 222) with the second electronic device based at least in part on the encryption key (e.g., using a PTK derived from the PMK to encrypt data).

Alternatively, when the authentication computer is available (operation 210), the electronic device may optionally communicate with the authentication computer to initiate the authentication (operation 224).

Note that the authentication computer may include a RADIUS server and/or a AAA server.

Moreover, the encryption key may include a pairwise master key (PMK).

Furthermore, the four-way handshake may include or may be compatible with EAPol.

Additionally, the network may include a virtual network associated with a location. For example, the virtual network may include: a VLAN or a VXLAN.

Note that the type of EAP may include: Protected EAP (PEAP), a password-based and one-way authentication protocol (such as EAP-MD5), EAP-Transport Layer Security (EAP-TLS), EAP-Tunnel TLS (EAP-TTLS), EAP-Encrypted Key Exchange (EKE), Lightweight EAP (LEAP), etc. For PEAP, generating the encryption key (operation 220) may involve: performing a hash (e.g., using the predefined hash function) of a password of a user, and then using the hash result to generate the encryption key.

In some embodiments, the authentication may include a MAC-level authentication implemented, at least in part, using software.

In some embodiments, the electronic device may optionally perform one or more additional operations (operation 226). Notably, prior to providing the identity request (operation 210), the electronic device may associate with (or establish a connection with) the second electronic device.

Moreover, the second electronic device may have previously been authenticated by the authentication computer and then may have disconnected from the electronic device. After the authentication computer authenticated the second electronic device, the electronic device may have: received, associated with the authentication computer, the predefined hash function and the authentication parameters, where the predefined hash function and the authentication parameters are associated with the second electronic device; and stored, in the memory, the predefined hash function and the authentication parameters.

Additionally, the authentication parameters may specify a time interval for the predefined hash function. After the time interval has elapsed, the electronic device may delete the predefined hash function. Alternatively, the electronic device may provide, addressed to the authentication computer, a renewal request prior to the time interval elapsing. In response, the electronic device may receive, associated with the authentication computer, a second predefined hash function and second authentication parameters. Then, the electronic device may store, in the memory, the second predefined hash function and the second authentication parameters.

In some embodiments of method 200, there may be additional or fewer operations. Furthermore, the order of the operations may be changed, and/or two or more operations may be combined into a single operation.

Figure 3:
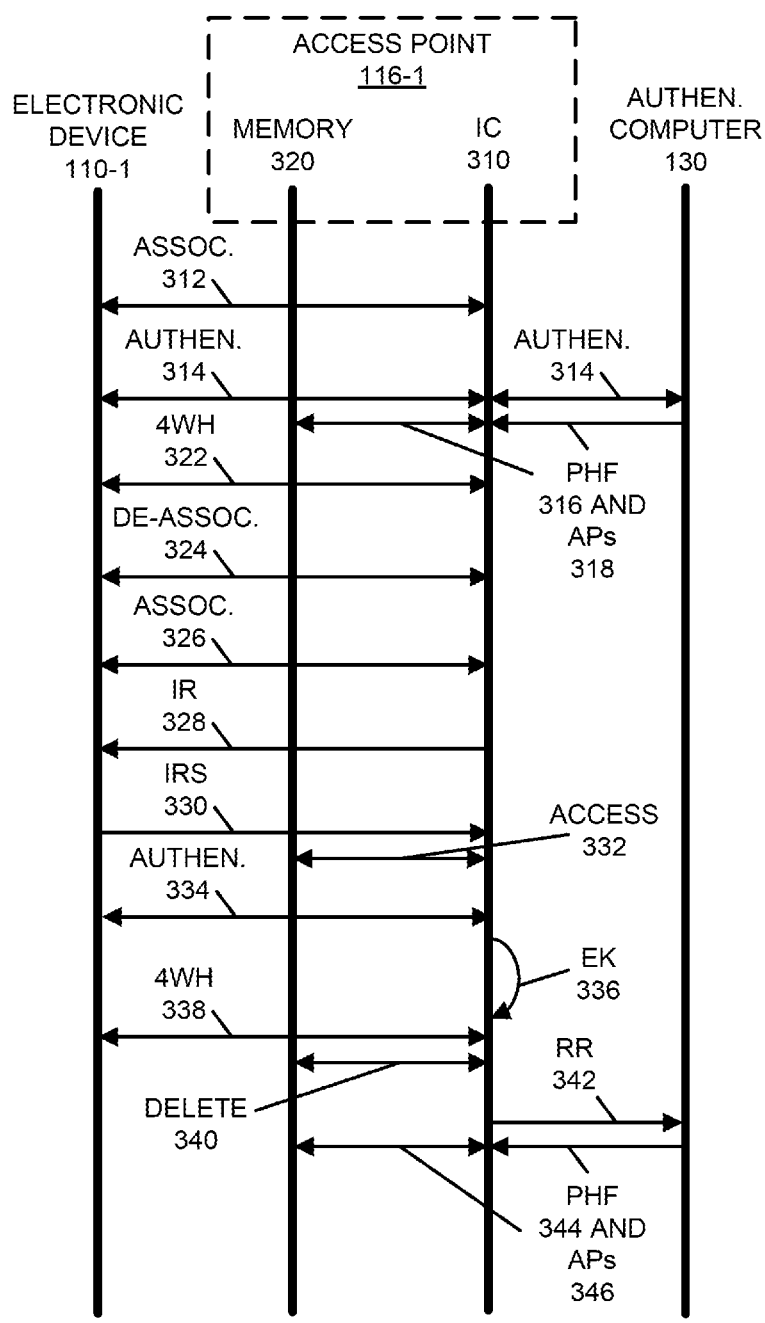
FIG. 3 is a drawing illustrating an example of communication among the electronic devices in FIG. 1 in accordance with an embodiment of the present disclosure.

Embodiments of the communication techniques are further illustrated in FIG. 3, which presents a drawing illustrating an example of communication among electronic device 110-1, access point 116-1, and authentication computer 130. In FIG. 3, electronic device 110-1 may discover and associate 312 with access point 116-1 via an interface circuit (IC) 310 in access point 116-1.

Moreover, electronic device 110-1 may authenticate 314 with authentication computer 130 via communication with interface circuit 310. After this occurs, authentication computer 130 may provide to interface circuit 310 a predefined hash function or PHF (such as a key hash) 316 and associated authentication parameters (APs) 318, which are associated with an authentication technique (such as a type of EAP). After receiving the predefined hash function 316 and the authentication parameters 318, interface circuit 310 may store the predefined hash function 316 and the authentication parameters 318 in memory 320 in access point 116-1. Then, interface circuit 310 may perform a four-way handshake (4WH) 322 with electronic device 110-1.

Subsequently, electronic device 110-1 may de-associate 324 from access point 116-1. Furthermore, electronic device 110-1 may subsequently associate 326 again with access point 116-1 via interface circuit 310. When this occurs, interface circuit 310 may provide an identity request (IR) 328 to electronic device 110-1. After receiving identity request 328, electronic device 110-1 may provide an identity response (IRS) 330 to access point 110-1, e.g., with a password of a user of electronic device 110-1. This identity response may be received by interface circuit 310.

Next, when authentication computer 130 is unavailable, interface circuit 310 may access 332 predefined hash function 316 and the authentication parameters 318 in memory 320. Additionally, interface circuit 310 may perform authentication 334 with electronic device 110-1 based at least in part on the predefined hash function 316, where the authentication is compatible with the authentication technique.

Moreover, interface circuit 310 may generate an encryption key (EK) 336, and may establish secure communication with electronic device 110-1 by performing a four-way handshake (4WH) 338 with electronic device 110-1 based at least in part on the encryption key 336.

Furthermore, the authentication parameters 318 may specify a time interval or a timeout for the predefined hash function 316. After the time interval has elapsed, interface circuit 310 may optionally delete 340 the predefined hash function 316. Alternatively, when authentication computer 130 is available, interface circuit 310 may provide, to authentication computer 130, a renewal request (RR) 342 prior to the time interval elapsing. In response, authentication computer 130 may provide to interface circuit 310 a second predefined hash function 344 and second authentication parameters 346, which are associated with the authentication technique. After receiving the second predefined hash function 344 and the second authentication parameters 346, interface circuit 310 may store the second predefined hash function 344 and the second authentication parameters 346 in memory 320.

While FIG. 3 illustrates communication between components using unidirectional or bidirectional communication with lines having single arrows or double arrows, in general the communication in a given operation in this figure may involve unidirectional or bidirectional communication. Moreover, while FIG. 3 illustrates operations being performed sequentially or at different times, in other embodiments at least some of these operations may, at least in part, be performed concurrently or in parallel.

We now further describe the communication techniques. In order to mitigate a load of an authentication computer and to provide survivability of an IEEE 802.1x-based WLAN service when the authentication computer is out of service for some time, the authentication computer may pass a key hash and related authentication parameters to an access point. Notably, after a first successful IEEE 802.1x authentication of an electronic device (or client), the authentication computer may pass a key hash and related authentication parameters and information specifying a type of EAP technique to the access point. Note that the authentication parameters may be associated with the client and may be used to generate a PMK. In some embodiments, the authentication parameters may include a hash timeout value. The access point may store the key hash and the authentication parameters until its timeout.

Then, the client may disconnect from the access point. When the client subsequently reconnects and associates with the access point, the access point may start IEEE 802.1x authentication by sending an identity request to the client. After receiving an identity response from the client, instead of initiating the type EAP technique with the authentication computer, the access point may use the stored key hash to start the IEEE 802.1x EAP technique with client. For example, the access point may perform the authentication with the client when the authentication computer is unavailable. However, in other embodiments, the access point may perform the authentication with the client for a variety of reasons (such as loading of the authentication computer or an authorization latency or delay), even when the authentication computer is available. Thus, the type of EAP authentication may happens internally between the client and the access point. Note that the access point may generate or derive a PMK, and the access point may perform a four-way handshake with the client. In some embodiments, after the key hash has timed out, the access point may delete the key hash.

Note that in some embodiments, a master key (MK) may be used to generate a PMK. For example, the PMK may be generated using a pseudorandom function hash (such as a TLS pseudorandom function or TLS-PRF) based at least in part on: the master key, a type of EAP authentication, a client random number and/or an access point random number. The PMK may be used to generate a PTK using a second pseudorandom function hash (such as an EAPol-PRF) based at least in part on: the master key, an access point nonce, a client nonce, an access point MAC address and/or a client MAC address. Moreover, the PTK may be used to determine or generate: a key confirmation key (KCK), e.g., using PTK bits 0-127; a key encryption key (KEK), e.g., using PTK bits 128-255; and/or a temporal key, e.g., using PTK bits 256-$n$ (where n is a non-zero integer greater than 256). Note that the temporal key may have a cipher-suite specific structure.

As shown in FIG. 3, during the communication techniques, after the first successful IEEE 802.1x authentication, the authentication computer may pass a key hash with related authentication parameters and information specifying the type of EAP technique to the access point. The authentication parameters may be the ones from the client and may be used to generate the PMK. In some embodiments, the authentication parameters may include the hash timeout value. The access point may store or cache the key hash (which is sometimes referred to as a 'hash key') or function and the authentication parameters until the timeout has expired.

Subsequently, the client may disconnect and then may reconnect. After IEEE 802.11 association, the access point may start IEEE 802.1x authentication by sending an identity request to the client. Upon receiving an identity response, instead of initiating the EAP authentication with the authentication computer, the access point may uses the stored hash function to start the IEEE 802.1x EAP authentication with the client. This EAP authentication may happen internally between the client and the access point. During this process, the access point may derive a new PMK and may perform the four-way handshake with the client. After the key hash timeout, the access point can delete the key hash. Alternatively, before the timeout, the access point may trigger a renew request to refresh the stored information. Upon receiving the renew request, the authentication computer may generate a new key hash by using new authentication parameters and may include them in the response to the access point.

Figure 4:
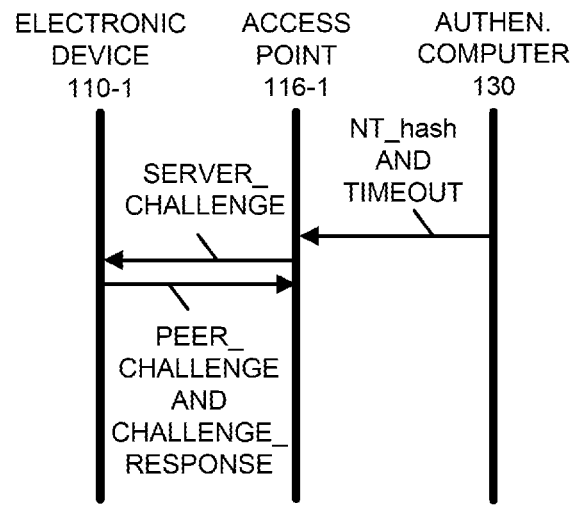
FIG. 4 is a drawing illustrating an example of communication among the electronic devices in FIG. 1 in accordance with an embodiment of the present disclosure.

The hash key and the authentication parameters derivation techniques may be different depending on the authentication technique. FIG. 4 presents a block diagram of an example of communication between authentication computer 130, access point 116-1 and electronic device 110-1 for PEAP Microsoft Challenge Handshake Authentication Protocol version 2 (MS-CHAPv2) authentication, including EAP-MSCHAPv2, EAP-PEAP-MSCHAPv2 and/or EAP-TTLS-MSCHAPv2. In FIG. 4, authentication computer 130 generates a hash function (NT_password_hash) and access point 116-1 exchanges the challenges with electronic device 110-1 and calculates if the challenge_response is as expected. Notably, authentication server 130 may provide the NT_password_hash and a timeout. Note that NT_password_hash may be defined in RFC 2759 (from the Internet Engineering Task Force of Fremont, California). Moreover, the peer_challenge and the server_challenge may be random numbers. A challenge_hash may be a secure hash algorithm 1 (SHA-1) cryptographic hash function of the peer challenge, the server challenge and a username of the user. Furthermore, the challenge_response may be a data encryption standard (des_encrypt) 56-bit symmetric encryption of the NT_password_hash and the challenge_hash.

Figure 5:
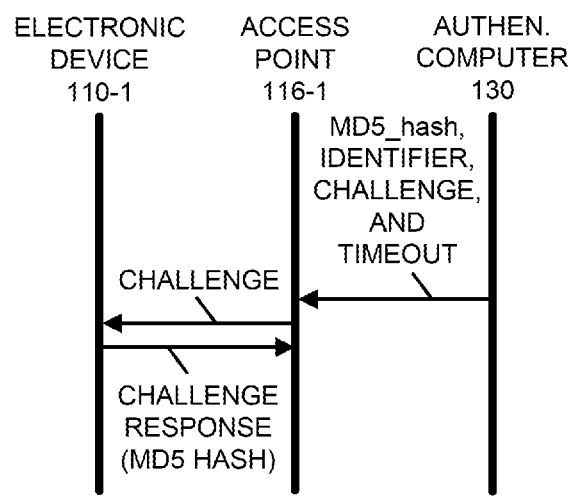
FIG. 5 is a drawing illustrating an example of communication among the electronic devices in FIG. 1 in accordance with an embodiment of the present disclosure.

FIG. 5 presents a block diagram of an example of communication between authentication computer 130, access point 116-1 and electronic device 110-1 for a message digest algorithm hash function (such as MD5), including EAP-MD5 and/or EAP-PEAP-MD5. In FIG. 5, authentication computer 130 generates the key_hash and passes it along with an identifier and a challenge to access point 116-1. Access point 116-1 may exchange the identifier and challenge with electronic device 110-1, and may verify the response hash. Note that the key_hash may be an md5 hash of the identifier, the password, and the challenge. In some embodiments, the identifier may be a username of the user.

In other embodiments, EAP-EKE or EAP-LEAP may be used. For example, in EAP-EKE, a hash function may be derived using a pseudorandom function hash of a password of the user. Consequently, authentication server 130 may only need to send this pseudorandom function hash of the password to access point 116-1. Then, access point 116-1 may perform the authentication with electronic device 110-

1. Moreover, in EAP-LEAP, authentication computer 130 may first generate an NT_password_hash first and provide it to access point 116-1.

While the preceding discussion illustrated the communication techniques with a variety of authentication techniques, in other embodiments the communication techniques may be extended for use with additional authentication techniques. For example, the communication techniques may be extended to be compatible with some types of EAP techniques (such as EAP-TTLS-Challenge Handshake Authentication Protocol or CHAP and EAP-generalized Pre-Shared Key or GPSK) that exchange parameters with the client to generate its hash key. Alternatively, the communication techniques may be extended to be compatible with other types of EAP techniques (such as EAP-TTLS-Password Authentication Protocol or PAP and EAP-Generic Token Card or GTC) that verify a password without a hash derivation. In these embodiments, the authentication computer may provide the necessary information to the access point needed to support any of these authentication techniques, thereby offloading the authentication to the access point.

We now describe embodiments of an electronic device, which may perform at least some of the operations in the communication techniques. FIG. 6 presents a block diagram illustrating an example of an electronic device 600 in accordance with some embodiments, such as one of: base station 108, one of electronic devices 110, computer 112, one of access points 116, one of radio nodes 118, switch 128, or authentication computer 130. This electronic device includes processing subsystem 610, memory subsystem 612, and networking subsystem 614. Processing subsystem 610 includes one or more devices configured to perform computational operations. For example, processing subsystem 610 can include one or more microprocessors, graphics processing units (GPUs), ASICs, microcontrollers, programmable-logic devices, and/or one or more digital signal processors (DSPs).

Memory subsystem 612 includes one or more devices for storing data and/or instructions for processing subsystem 610 and networking subsystem 614. For example, memory subsystem 612 can include DRAM, static random access memory (SRAM), and/or other types of memory. In some embodiments, instructions for processing subsystem 610 in memory subsystem 612 include: one or more program modules or sets of instructions (such as program instructions 622 or operating system 624, such as Linux, UNIX, Windows Server, or another customized and proprietary operating system), which may be executed by processing subsystem 610. Note that the one or more computer programs, program modules or instructions may constitute a computer-program mechanism. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610.

In addition, memory subsystem 612 can include mechanisms for controlling access to the memory. In some embodiments, memory subsystem 612 includes a memory hierarchy that comprises one or more caches coupled to a memory in electronic device 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Networking subsystem 614 includes one or more devices configured to couple to and communicate on a wired and/or wireless network (i.e., to perform network operations), including: control logic 616, an interface circuit 618 and one or more antennas 620 (or antenna elements). (While FIG. 6 includes one or more antennas 620, in some embodiments electronic device 600 includes one or more nodes, such as antenna nodes 608, e.g., a metal pad or a connector, which can be coupled to the one or more antennas 620, or nodes 606, which can be coupled to a wired or optical connection or link. Thus, electronic device 600 may or may not include the one or more antennas 620. Note that the one or more nodes 606 and/or antenna nodes 608 may constitute input(s) to and/or output(s) from electronic device 600.) For example, networking subsystem 614 can include a Bluetooth™ networking system, a cellular networking system (e.g., a 3G/4G/5G network such as UMTS, LTE, etc.), a universal serial bus (USB) networking system, a coaxial interface, a High-Definition Multimedia Interface (HDMI) interface, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 600 may be adapted or changed using pattern shapers (such as directors or reflectors) and/or one or more antennas 620 (or antenna elements), which can be independently and selectively electrically coupled to ground to steer the transmit antenna pattern in different directions. Thus, if one or more antennas 620 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 600 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 600 may use the mechanisms in networking subsystem 614 for performing simple wireless communication between the electronic devices, e.g., transmitting advertising or beacon frames and/or scanning for advertising frames transmitted by other electronic devices as described previously.

Within electronic device 600, processing subsystem 610, memory subsystem 612, and networking subsystem 614 are coupled together using bus 628. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 includes a display subsystem 626 for displaying information on a display, which may include a display driver and the display, such as a liquid-crystal display, a multi-touch touchscreen, etc.

Moreover, electronic device 600 may include a user-interface subsystem 630, such as: a mouse, a keyboard, a trackpad, a stylus, a voice-recognition interface, and/or another human-machine interface. In some embodiments, user-interface subsystem 630 may include or may interact with a touch-sensitive display in display subsystem 626.

Electronic device 600 can be (or can be included in) any electronic device with at least one network interface. For example, electronic device 600 can be (or can be included in): a desktop computer, a laptop computer, a subnotebook/netbook, a server, a tablet computer, a cloud-based computing system, a smartphone, a cellular telephone, a smartwatch, a wearable electronic device, a consumer-electronic device, a portable computing device, an access point, a transceiver, a router, a switch, communication equipment, an eNodeB, a controller, test equipment, and/or another electronic device.

Although specific components are used to describe electronic device 600, in alternative embodiments, different components and/or subsystems may be present in electronic device 600. For example, electronic device 600 may include one or more additional processing subsystems, memory subsystems, networking subsystems, and/or display subsystems. Additionally, one or more of the subsystems may not be present in electronic device 600. Moreover, in some embodiments, electronic device 600 may include one or more additional subsystems that are not shown in FIG. 6. Also, although separate subsystems are shown in FIG. 6, in some embodiments some or all of a given subsystem or component can be integrated into one or more of the other subsystems or component(s) in electronic device 600. For example, in some embodiments instructions 622 is included in operating system 624 and/or control logic 616 is included in interface circuit 618.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 614 and/or of electronic device 600. The integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals).

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi, LTE and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 622, operating system 624 (such as a driver for interface circuit 618) or in firmware in interface circuit 618. Alternatively or additionally, at least some of the operations in the communication techniques may be implemented in a physical layer, such as hardware in interface circuit 618.

Note that the use of the phrases 'capable of,' 'capable to,' 'operable to,' or 'configured to' in one or more embodiments, refers to some apparatus, logic, hardware, and/or element designed in such a way to enable use of the apparatus, logic, hardware, and/or element in a specified manner.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A first electronic device, comprising:
   one or more interface circuits configured to communicate with a second electronic device and an authentication computer;
   a processor coupled to the interface circuit; and
   memory, coupled to the processor, configured to store program instructions, wherein, when executed by the processor, the program instructions cause the first electronic device to perform operations comprising:
      providing an identity request addressed to the second electronic device;
      receiving, associated with the second electronic device, an identity response;
      when the authentication computer is unavailable, accessing, in the memory, a predefined hash function and associated authentication parameters for an authentication technique, wherein the predefined hash function is configured to provide an output based at least in part on an input to the predefined hash function;
      performing authentication to a network with the second electronic device based at least in part on the predefined hash function, wherein the authentication is compatible with the authentication technique;
      generating an encryption key; and
      establishing secure communication with the second electronic device by performing a four-way handshake with the second electronic device based at least in part on the encryption key, wherein the authentication parameters specify a time interval for the predefined hash function; and the operations comprise, after the time interval has elapsed, deleting the predefined hash function.

2. The first electronic device of claim 1, wherein the first electronic device comprises an access point.

3. The first electronic device of claim 1, wherein the authentication computer comprises a remote authentication dial-in user service (RADIUS) server or an authentication, authorization, and accounting (AAA) server.

4. The first electronic device of claim 1, wherein the second electronic device was previously authenticated by the authentication computer and then disconnected from the first electronic device.

5. The first electronic device of claim 4, wherein, after the authentication computer authenticated the second electronic device, the operations comprise:
   receiving, associated with the authentication computer, the predefined hash function and the authentication parameters, wherein the predefined hash function and the authentication parameters are associated with the second electronic device; and
   storing, in the memory, the predefined hash function and the authentication parameters.

6. The first electronic device of claim 1, wherein the authentication technique comprises a type of Extensible Authentication Protocol (EAP).

7. The first electronic device of claim 1, wherein the operations comprise, prior to providing the identity request, associating with the second electronic device.

8. The first electronic device of claim 1, wherein the encryption key comprises a pairwise master key (PMK).

9. The first electronic device of claim 1, wherein the authentication parameters specify a time interval for the predefined hash function; and
   wherein the operations comprise:
      providing, addressed to the authentication computer, a renewal request prior to the time interval elapsing;
      receiving, associated with the authentication computer, a second predefined hash function and second authentication parameters; and
      storing, in the memory, the second predefined hash function and the second authentication parameters.

10. The first electronic device of claim 1, wherein the four-way handshake comprises or is compatible with Extensible Authentication Protocol (EAP) over local area network (EAPol).

11. The first electronic device of claim 1, wherein the network comprises a virtual network associated with a location.

12. The first electronic device of claim 11, wherein the virtual network comprises: a virtual local area network (VLAN) or a virtual extensible local area network (VXLAN).

13. A non-transitory computer-readable storage medium for use in conjunction with a first electronic device, the computer-readable storage medium storing program instructions that, when executed by the first electronic device, cause the first electronic device to perform operations comprising:
   providing an identity request addressed to a second electronic device;
   receiving, associated with the second electronic device, an identity response;
   when an authentication computer is unavailable, accessing, in memory in the first electronic device, a predefined hash function and associated authentication parameters for an authentication technique, wherein the predefined hash function is configured to provide an output based at least in part on an input to the predefined hash function;
   performing authentication to a network with the second electronic device based at least in part on the predefined hash function, wherein the authentication is compatible with the authentication technique;

generating an encryption key; and establishing secure communication with the second electronic device by performing a four-way handshake with the second electronic device based at least in part on the encryption key, wherein the authentication parameters specify a time interval for the predefined hash function; and the operations comprise, after the time interval has elapsed, deleting the predefined hash function.

14. The non-transitory computer-readable storage medium of claim 13, wherein the first electronic device comprises an access point.

15. The non-transitory computer-readable storage medium of claim 13, wherein the second electronic device was previously authenticated by the authentication computer and then disconnected from the first electronic device; and wherein the operations comprise, after the authentication computer authenticated the second electronic device:

receiving, associated with the authentication computer, the predefined hash function and the authentication parameters, wherein the predefined hash function and the authentication parameters are associated with the second electronic device; and storing, in the memory, the predefined hash function and the authentication parameters.

16. A method for selectively perform authentication to a network, comprising:

by a first electronic device:

providing an identity request addressed to a second electronic device;

receiving, associated with the second electronic device, an identity response;

based at least in part on unavailability of an authentication computer, accessing, in memory in the first electronic device, a predefined hash function and associated authentication parameters for an authentication technique, wherein the predefined hash function provides an output based at least in part on an input to the predefined hash function;

performing the authentication with the second electronic device based at least in part on the predefined hash function, wherein the authentication is compatible with the authentication technique;

generating an encryption key; and establishing secure communication with the second electronic device by performing a four-way handshake with the second electronic device based at least in part on the encryption key, wherein the authentication parameters specify a time interval for the predefined hash function; and the operations comprise, after the time interval has elapsed, deleting the predefined hash function.

17. The method of claim 16, wherein the first electronic device comprises an access point.

18. The method of claim 16, wherein the second electronic device was previously authenticated by the authentication computer and then disconnected from the first electronic device; and wherein the method comprises, after the authentication computer authenticated the second electronic device:

receiving, associated with the authentication computer, the predefined hash function and the authentication parameters, wherein the predefined hash function and the authentication parameters are associated with the second electronic device; and storing, in the memory, the predefined hash function and the authentication parameters.

19. The method of claim 18, wherein the authentication parameters specify a time interval for the predefined hash function; and wherein the method comprises:

providing, addressed to the authentication computer, a renewal request prior to the time interval elapsing;

receiving, associated with the authentication computer, a second predefined hash function and second authentication parameters; and storing, in the memory, the second predefined hash function and the second authentication parameters.

20. The method of claim 16, wherein the second electronic device was previously authenticated by the authentication computer and then disconnected from the first electronic device.

* * * * *